(12) United States Patent
Yurt et al.

(10) Patent No.: US 9,890,304 B2
(45) Date of Patent: Feb. 13, 2018

(54) LIQUID OPTICAL ADHESIVE COMPOSITIONS

(71) Applicant: 3M INNOVATIVE PROPERTIES COMPANY, St. Paul, MN (US)

(72) Inventors: Serkan Yurt, St. Paul, MN (US); Jason D. Clapper, Lino Lakes, MN (US); Ross E. Behling, Woodbury, MN (US); Christopher J. Campbell, Burnsville, MN (US); Mark F. Ellis, St. Paul, MN (US); Larry R. Krepski, White Bear Lake, MN (US); Ann R. Fornof, St. Paul, MN (US); Babu N. Gaddam, Woodbury, MN (US); James P. DiZio, St. Paul, MN (US)

(73) Assignee: 3M INNOVATIVE PROPERTIES, St. Paul, MN (US)

( * ) Notice: Subject to any disclaimer, the term of this patent is extended or adjusted under 35 U.S.C. 154(b) by 0 days.

(21) Appl. No.: 14/437,214

(22) PCT Filed: Nov. 26, 2013

(86) PCT No.: PCT/US2013/071883
§ 371 (c)(1),
(2) Date: Apr. 21, 2015

(87) PCT Pub. No.: WO2014/093014
PCT Pub. Date: Jun. 19, 2014

(65) Prior Publication Data
US 2015/0284601 A1    Oct. 8, 2015

Related U.S. Application Data

(60) Provisional application No. 61/778,679, filed on Mar. 13, 2013, provisional application No. 61/735,296, filed on Dec. 10, 2012.

(51) Int. Cl.
| | |
|---|---|
| *C09J 133/08* | (2006.01) |
| *C09J 4/00* | (2006.01) |
| *C09J 133/06* | (2006.01) |
| *C09J 133/14* | (2006.01) |
| *C09J 143/04* | (2006.01) |
| *C09J 7/02* | (2006.01) |
| *C08F 220/20* | (2006.01) |
| *C08F 220/18* | (2006.01) |
| *C08F 220/34* | (2006.01) |

(52) U.S. Cl.
CPC .............. *C09J 133/08* (2013.01); *C09J 4/00* (2013.01); *C09J 7/02* (2013.01); *C09J 133/066* (2013.01); *C09J 133/14* (2013.01); *C09J 143/04* (2013.01); *C08F 220/20* (2013.01); *C08F 2220/1891* (2013.01); *C08F 2220/343* (2013.01); *C08L 2312/00* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 4,338,190 A | * | 7/1982 | Kraus | A61M 1/284 210/195.2 |
| 4,652,494 A | | 3/1987 | Brevet | |
| 5,250,591 A | * | 10/1993 | Fujii | C08F 299/024 522/117 |
| 5,506,279 A | * | 4/1996 | Babu | C07C 233/49 522/34 |
| 6,448,301 B1 | * | 9/2002 | Gaddam | C08F 8/00 522/113 |
| 6,596,787 B1 | | 7/2003 | Levandoski | |
| 6,664,306 B2 | | 12/2003 | Gaddam | |
| 6,887,917 B2 | * | 5/2005 | Yang | C08F 290/061 428/343 |
| 7,005,143 B2 | | 2/2006 | Abuelyaman | |
| 7,691,437 B2 | | 4/2010 | Ellis | |
| 7,767,728 B2 | | 8/2010 | Lu | |
| 8,288,450 B2 | | 10/2012 | Song | |
| 9,309,443 B2 | * | 4/2016 | Yurt | |
| 2005/0209360 A1 | * | 9/2005 | Graichen | C08F 290/06 522/178 |
| 2006/0292378 A1 | | 12/2006 | Mgaya | |
| 2007/0191506 A1 | * | 8/2007 | Lu | C08F 2/48 522/178 |
| 2009/0117378 A1 | | 5/2009 | Hu | |

(Continued)

FOREIGN PATENT DOCUMENTS

| | | |
|---|---|---|
| JP | 2008-195753 | 8/2008 |
| WO | WO 2000-09619 | 2/2000 |

(Continued)

OTHER PUBLICATIONS

Product data sheet "2-Hydroxyethyl acrylate", Sigma-Aldrich, retrived Nov. 9, 2016.*
Harry R. Allcock et al., "Contemporary Polymer Chemistry", 2003, Pearson Education Inc., pp. 2-3.*
"Urethaneacrylate for Coating and Adhesive", Japan U-Pica Company, Ltd., 1 page.
"U-PiCA Urethaneacrylate", 2011, Japan U-Pica Company, Ltd., 2 pages.

(Continued)

*Primary Examiner* — Anish Desai
(74) *Attorney, Agent, or Firm* — Carolyn A. Fischer

(57) ABSTRACT

The disclosure describes a curable composition comprising a first oligomer having a plurality of polymerizable groups; a second component comprising alkylene oxide repeat units and terminal polymerizable groups, a solvent monomer component; and a photoinitiator. The curable composition may be used as an adhesive in optical applications.

15 Claims, No Drawings

(56) References Cited

U.S. PATENT DOCUMENTS

| | | |
|---|---|---|
| 2009/0283211 A1 | 11/2009 | Matsuhira |
| 2010/0029059 A1 | 2/2010 | Matsumura |
| 2010/0055376 A1* | 3/2010 | Saito .................. B32B 7/12 428/65.1 |
| 2010/0086705 A1 | 4/2010 | Everaerts |
| 2010/0086706 A1 | 4/2010 | Everaerts |
| 2010/0118245 A1 | 5/2010 | Toyoda |
| 2010/0265444 A1 | 10/2010 | Nguyen |
| 2011/0021655 A1 | 1/2011 | Smothers |
| 2011/0033720 A1 | 2/2011 | Fujita |
| 2011/0123800 A1 | 5/2011 | Sherman |
| 2011/0201717 A1 | 8/2011 | Held |
| 2012/0115976 A1* | 5/2012 | Igarashi ............... C09J 4/06 522/120 |
| 2013/0011683 A1* | 1/2013 | Busman .............. C09D 133/04 428/423.1 |
| 2013/0136874 A1* | 5/2013 | Xia ..................... C09J 4/00 428/1.5 |
| 2015/0184031 A1* | 7/2015 | Yurt .................... C09J 4/06 428/339 |

FOREIGN PATENT DOCUMENTS

| | | | |
|---|---|---|---|
| WO | WO 2010-027041 | 3/2010 | |
| WO | WO 2011-084405 | 7/2011 | |
| WO | WO 2011-119828 | 9/2011 | |
| WO | WO 2012-024217 | 2/2012 | |
| WO | WO 2012024217 A1 * | 2/2012 | ............... C09J 4/00 |
| WO | WO 2013-013590 | 1/2013 | |
| WO | WO 2013-181030 | 12/2013 | |

OTHER PUBLICATIONS

"Neopol" & "U-PiCA", Epoxyacrylate & Urethaneacrylate for UV curing, Japan U-Pica Company, Ltd., 11 pages.

International Search Report for PCT International Application No. PCT/US2013/071883 dated Mar. 4, 2014, 5 pages.

* cited by examiner

LIQUID OPTICAL ADHESIVE COMPOSITIONS

CROSS REFERENCE TO RELATED APPLICATIONS

This application is a national stage filing under 35 U.S.C. 371 of PCT/US2013/071883, filed Nov. 26, 2013, which claims priority to U.S. Provisional Application Nos. 61/778,679, filed Mar. 13, 2013, and 61/735,296, filed Dec. 10, 2012, the disclosure of which is incorporated by reference in its/their entirety herein.

FIELD

The present disclosure relates to optically clear adhesives and laminates that include the adhesives.

BACKGROUND

Optically clear adhesives are finding wide applications in optical displays. Such applications include bonding polarizers to modules of a liquid crystal display (LCD) and attaching various optical films to a glass lens in, for example, mobile hand held (MHH) devices.

Although various liquid optically clear adhesives have been described, industry would find advantage in composition having improved adhesion.

SUMMARY

A curable adhesive composition comprising: a) a first oligomer comprising (meth)acrylate ester monomer units, hydroxyl-functional monomer units, and monomer units having polymerizable groups; b) a second component comprising $C_2$-$C_4$ alkylene oxide repeat units and polymerizable terminal groups, and c) a diluent monomer component. The polymerizable groups of the first oligomer are typically free-radically photopolymerizable groups, such as pendent (meth)acrylate groups or terminal aryl ketone photoinitiator groups.

Also described are optically clear laminates comprising a first substrate having at least one major surface; and the curable adhesive described herein in contact with the major surface of the first substrate.

Also described is a method of making a curable adhesive composition comprising: providing a first oligomer comprising (meth)acrylate ester monomer units, hydroxyl-functional monomer units, and monomer units having polymerizable groups; and combining the first oligomer, a second component comprising $C_2$-$C_4$ alkylene oxide repeat units and polymerizable terminal groups, and a diluent monomer component.

DETAILED DESCRIPTION

As used herein:

"cloud point" refers to the temperature at which the cured adhesive forms a continuous adhesive phase and a dispersed water phase after conditioning at a specified temperature and humidity, where the dispersed phase is larger than the wavelength of light and thus make the adhesive appear "white" or cloudy;

"Alkyl" means a linear or branched, cyclic or acyclic, saturated monovalent hydrocarbon having from one to about 32, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Heteroalkyl" includes both straight-chained, branched, and cyclic alkyl groups with one or more heteroatoms independently selected from S, P, Si, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"Aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is an aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(Hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

"acryloyl" is inclusive of both esters and amides.

"(meth)acryloyl" includes both acryloyl and methacryloyl groups; i.e. is inclusive of both esters and amides.

"oligomer" refers to a molecule having relatively few monomeric repeat units as compared to polymers, as indicative by the molecular weight.

The curable adhesive composition comprises a first oligomer. The first oligomer comprises (meth)acrylate ester monomer units, hydroxyl-functional monomer, and monomer units having polymerizable groups, such as pendent (meth)acrylate groups or terminal (e.g. aryl ketone) photoinitiator group.

The curable adhesive composition further comprises a second component. The inclusion of the second component can enhance the adhesion properties. The curable adhesive compositions can provide a pluck adhesion (as measured according to the test method described in the forthcoming examples) of at least 80, 85, 90, or 95 N/cm$^2$. In some embodiments, the pluck adhesion is at least 100, 110, or 120 N/cm$^2$. In yet other embodiments, the pluck adhesion is at least 130, 140, 150, or 160 N/cm$^2$. The pluck adhesion can range up to at least 200 N/cm$^2$.

The first oligomer, second component and diluent monomer (together with any other optional components) form an optically clear homogeneous mixture that is a liquid at 25° C. The first oligomer, second component, and diluent are each typically liquids at 25° C. The first oligomer can be characterized as a solute oligomer in that it is dissolved by the diluent monomer alone or the combination of diluent monomer and second component.

Further, the desired increase in pluck adhesion may not be achieved. For example, when "U-PiCA 8967A" reported by the supplier to have a number average molecular weight (Mn) of 18,000 g/mole, was substituted for "U-PiCA 8966A" in Example 3, an increase in pluck adhesion was not found.

Such methacrylate materials are reported by the supplier to have the general structure

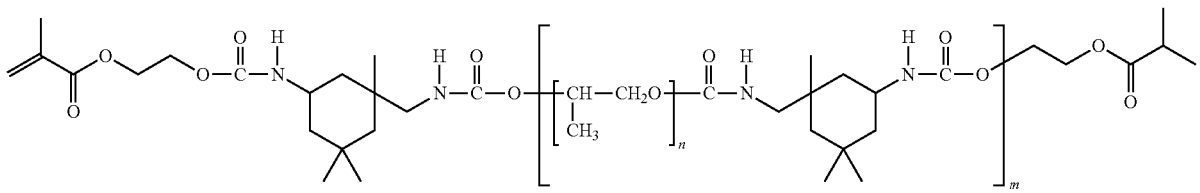

The second component comprises $C_2$-$C_4$ alkylene oxide repeat units. Ethylene oxide repeat units can be considered hydrophilic groups and can thus contribute to the hydrophilic content of the curable adhesive composition. However, as the chain length of the alkylene group increases, the alkylene oxide decreases in hydrophilicity and increase in hydrophobicity. In some embodiments, the repeat units of the second component comprise or consist of $C_3$ alkylene oxide repeat units. The second component may comprise at least 30, 40, 50, 60, 70, 80, or 90 wt-% of $C_2$-$C_4$ alkylene oxide, such as polypropylene oxide (PPG). The concentration of $C_2$-$C_4$ alkylene oxide in the second component or adhesive composition can be determined with known quantitative techniques such as NMR.

The second component further comprises divalent linking groups between the (e.g. $C_3$) $C_2$-$C_4$ alkylene oxide repeat unit and the polymerizable terminal groups. The second component typically comprises 1, 2, or 3 polymerizable terminal groups, such as (meth)acrylate groups. When the second component comprises (meth)acrylate terminal groups it may be considered a (meth)acrylate monomer or oligomer. The divalent linking group can comprise —NH, —N(H)C(O)— or —N(H)C(O)O— groups, such as in the case of urethane linkages. In such embodiment, the second component may be characterized as a urethane (meth) acrylate monomer or oligomer.

The molecular weight (Mn) of the second component is typically at least 1500 or 2000 g/mole and typically no greater than 50K, 40K, 30K, 25K or 20K. In some embodiments, the molecular weight (Mn) of the second component is no greater than 15K, 14K, 13K, 12K or 10K. In some embodiments, the molecular weight (Mn) of the second component is no greater than 9K, 8K, 7K, 6K or 5K.

One class of materials for use as the second component are polypropylene glycol urethane (meth)acrylates available from Japan U-PiCA Company, Ltd., under the trade designation "U-PiCA 8965" and "U-PiCA 8966". "U-PiCA 8965A" is reported by the supplier to have a number average molecular weight (Mn) of 1800 g/mole; whereas "U-PiCA 8966A" is reported to have a number average molecular (Mn) weight of 3600 g/mole. The molecular weight of "U-PiCA 8966A" was confirmed using Nuclear Magnetic Resonance analysis.

When the molecular weight of the second component is too high, the viscosity of the curable adhesive also increases.

wherein n is the number of propylene oxide repeat units, and m is the number of repeat units comprising propylene oxide repeat units and urethane linkages. Such materials are also available with acrylate terminal groups instead of methacrylate.

The second component can generally be prepared from first reacting a (e.g. polypropylene) polyalkylene oxide diol with a diisocyanate and then reacting the diisocyanate end groups with a hydroxy alkylene (meth)acrylate compound to form the terminal (meth)acrylate groups.

Various aliphatic and aromatic diisocyanates starting materials are available. Aromatic diisocyanates include 2,4-tolulene diisocyanate (2,4-TDI), 2,6-tolulene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylene diisocyanate (XDI), tetramethyl xylene diisocyanate (TMXDI), toluidine diisocyanate, (TODI) and 1,5-naphthalene diisocyanate (NDI). Aliphatic diisocyanates include hexamethylene diisocyanate (HDI), trimethylhexamethylene diisocyanate (TMHDI), lysine diisocyanate, and norbornane diisocyanate (NBDI); alicyclic isocyanate, e.g., trans-cyclohexane-1,4-diisocyanate, isophorone diisocyanate (IPDI); carbodiimide-modified diisocyanates of the foregoing diisocyanates; or isocyanurate-modified diisocyanates thereof.

In some embodiments, the second component comprises a residue of a (e.g. cyclic) aliphatic diisocyanate, such as isophorone diisocyanate (IPDI). When such isocyanate is utilized, the divalent linking groups of the second polymerizable material comprise the following structure

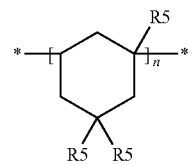

wherein R5 is independently hydrogen or methyl and n is 1. In some embodiments each R5 is methyl.

When other polyalkylene oxide components and diisocyanate starting materials are utilized, the second oligomer may have the general formula:

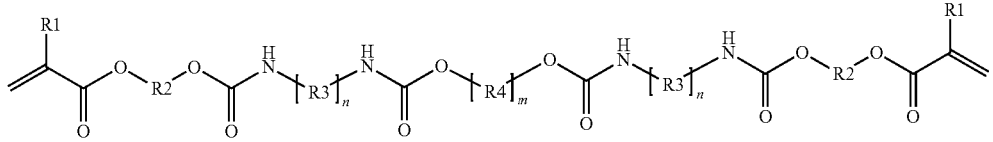

wherein R1 is hydrogen or methyl,
R2 is alkylene, arylene, or alkarylene,
for each m, R4 is independently a $C_2$-$C_4$ alkylene oxide, m ranges from 5 to 100;
R3 is independently a residue of the previously described diisocyanates.

In some R2 is a $C_2$ to $C_4$ alkylene and more typically $C_2$. R4 is preferably $C_3$ alkylene oxide. In some embodiment, m is at least 10, 15 or 20. In some embodiments, m is no greater than 75 or 50.

The first oligomer comprises (meth)acrylate ester monomer units. (Meth)acrylate ester can include aliphatic, cycloaliphatic, or aromatic alkyl groups. Useful alkyl acrylates (i.e., acrylic acid alkyl ester monomers) include linear or branched monofunctional acrylates or methacrylates of nontertiary alkyl alcohols.

Useful monomers include, for example, 2-ethylhexyl (meth)acrylate, ethyl(meth)acrylate, methyl(meth)acrylate, n-propyl(meth)acrylate, isopropyl(meth)acrylate, pentyl (meth)acrylate, n-octyl(meth)acrylate, isooctyl(meth)acrylate, isononyl(meth)acrylate, n-butyl(meth)acrylate, isobutyl(meth)acrylate, hexyl(meth)acrylate, isobornyl(meth) acrylate, n-nonyl(meth)acrylate, isoamyl(meth)acrylate, n-decyl(meth)acrylate, isodecyl(meth)acrylate, lauryl(meth) acrylate, dodecyl(meth)acrylate, cyclohexyl(meth)acrylate, phenyl meth(acrylate), benzyl meth(acrylate), tridecyl (meth)acrylate, 2-propylheptyl(meth)acrylate and 2-methylbutyl(meth)acrylate, and combinations thereof. In some embodiments, the average carbon number of the alkanol portion of the (meth)acrylates is 10 to 14.

The first oligomer typically has a $T_g$ of <20° C., or <10° C., or <0° C. A useful predictor of interpolymer $T_g$ for specific combinations of various monomers can be computed by application of Fox Equation: $1/T_g=\Sigma Wi/T_gi$. In this equation, $T_g$ is the glass transition temperature of the mixture, Wi is the weight fraction of component i in the mixture, and $T_gi$ is the glass transition temperature of component i, and all glass transition temperatures are in Kelvin (K). In order that the oligomer have a $T_g$<20° C., it is expedient to include low $T_g$ monomers.

As used herein the term "low $T_g$ monomer" refers to a monomer, which when homopolymerized, produces a (meth)acryloyl polymer having a $T_g$ of <20° C. The incorporation of the low $T_g$ monomer into the oligomer is sufficient to reduce the glass transition temperature of the resulting oligomer to <20° C., as calculated using the Fox Equation. Alternatively, the glass transition temperature can be measured in a variety of known ways, including, e.g., through differential scanning calorimetry (DSC).

Suitable low $T_g$ monomers have one ethylenically unsaturated group and a glass transition temperature of less than 20° C., or less than 10° C., (as estimated by the Fox Equation), which are suitable include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfuryl-acrylate, ethoxy-ethoxyethyl acrylate and ethoxylated-nonylacrylate. In some embodiments, isoctylacrylate and tridecylacrylate can be preferred.

In some embodiments, the (meth)acrylate ester is derived from alkanols having an average carbon number of $C_4$-$C_{32}$. Typically the alkanols have an average carbon number no greater than $C_{18}$, or $C_{16}$, or $C_{14}$. In some embodiments, the alkanols have an average carbon number of at least $C_6$ or $C_8$, and in some embodiments at least $C_{10}$. The average carbon number may be calculated based on the weight percentages of each (meth)acrylate ester monomer.

The first oligomer typically comprises greater than 50 parts by weight (i.e. wt-%) of (e.g. low Tg) (meth)acrylate ester monomer units. In some embodiments, the first oligomer comprises at least 55, 60, 65, or 70 parts by weight of (e.g. low Tg) (meth)acrylate ester monomer units. In some embodiments, the first oligomer comprises at least 75, 80, 85, or 90 parts by weight of (e.g. low Tg) (meth)acrylate ester monomer units.

The first oligomer further comprises a hydrophilic, hydroxyl functional monomer. The hydrophilic, hydroxyl functional monomeric compound typically has a hydroxyl equivalent weight of less than 400. The hydroxyl equivalent molecular weight is defined as the molecular weight of the monomeric compound divided by the number of hydroxyl groups in the monomeric compound The hydroxyl functional monomer has the general formula:

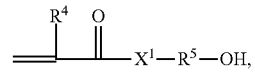

wherein
$R^5$ is a (hetero)hydrocarbyl group, including alkylene, arylene and combinations thereof, more preferably a $C_1$-$C_6$ alkylene;
$R^4$ is —H or $C_1$-$C_4$ alkyl; and
$X^1$ is —$NR^4$— or —O—.

Useful monomers of this type include hydroxyethyl (meth)acrylate, hydroxypropyl(meth)acrylate, 2-hydroxy-2-phenoxypropyl(meth)acrylate, and hydroxybutyl(meth) acrylate, 2-hydroxyethylacrylamide, and N-hydroxypropylacrylamide.

The hydroxyl functional monomer is generally used in amounts of at least 2, 3, 4, or 5 parts by weight based upon 100 parts total monomeric units of the first oligomer. The hydroxyl functional monomer is typically used in amounts of no greater than 49 parts by weight based upon 100 parts total monomeric units of the first oligomer. In some embodiments, the first oligomer comprises no greater than 45, or 40, or 35, or 30, or 25 hydroxyl functional monomeric units.

The first oligomer or the curable adhesive composition optionally further comprises a hydrophilic polar monomer, other than the hydroxyl-functional monomer. The hydrophilic monomer typically has an average molecular weight ($M_n$) of greater than about 70, or greater than about 500, or even higher. Suitable hydrophilic monomer compounds include poly(ethylene oxide) segments, hydroxyl functionality, or a combination thereof. The combination of poly(ethylene oxide) and hydroxyl functionality in the oligomer, second component, and diluent monomer are preferably sufficiently high such that the resulting adhesive composition is hydrophilic. By "hydrophilic" it is meant that the cured adhesive composition can incorporate at least 25 weight percent of water without (cloud point) phase separation.

Suitable hydrophilic monomer compounds may contain poly(ethylene oxide) segments that include at least 10, at least 20, or even at least 30 ethylene oxide units. Alternatively, suitable hydrophilic monomer compounds include at least 25 weight percent of oxygen in the form of ethylene glycol groups from poly(ethylene oxide) or hydroxyl functionality based upon the hydrocarbon content of the monomer.

Useful hydrophilic monomer compounds may be copolymerizable or non-copolymerizable with the adhesive composition, as long as they remain miscible with the adhesive and yield an optically clear adhesive composition. Copolymerizable, hydrophilic monomer compounds include, for example, CD552, available from Sartomer Company, Exton, Pa., which is a monofunctional methoxylated polyethylene glycol (550) methacrylate, or SR9036, also available from Sartomer, that is an ethoxylated bisphenol A dimethacrylate that has 30 polymerized ethylene oxide groups between the bisphenol A moiety and each methacrylate group. Other examples include phenoxypolyethylene glycol acrylate available from Jarchem Industries Inc., Newark, N.J.

The polar monomer component may also include weakly polar monomers such as acrylic monomer containing carboxylic acid, amide, urethane, or urea functional groups. In general, the polar monomer content in the adhesive can include less than about 5 parts by weight or even less than about 3 parts by weight of one or more polar monomers. Useful carboxylic acids include acrylic acid and methacrylic acid. Useful amides include N-vinyl caprolactam, N-vinyl pyrrolidone, (meth)acrylamide, N-methyl(meth)acrylamide, N,N-dimethyl acrylamide, N,N-dimethyl meth(acrylamide), and N-octyl(meth)acrylamide.

The hydroxyl functional monomer and optional polar monomers are used in amounts such that the oligomer is hydrophilic. By "hydrophilic" it is meant that the oligomeric compound can incorporate at least 25 weight percent of water without phase separation. Generally the polar monomer are used in amounts of 0 to 20 parts, based on 100 parts total monomer of the oligomer. Generally the polar monomer, when present is used in amounts of 1 to 10 parts, preferably 1 to 5 parts.

The first oligomer or the curable adhesive composition optionally contains silane monomers [$M^{Silane}$] including those with the following formula:

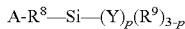

wherein:

A is an ethylenically unsaturated polymerizable group, including vinyl, allyl, vinyloxy, allyloxy, and (meth)acryloyl, preferably (meth)acrylate;

$R^8$ is a covalent bond or a divalent (hetero)hydrocarbyl group.

In one embodiment $R^8$ is a divalent hydrocarbon bridging group of about 1 to 20 carbon atoms, including alkylene and arylene and combinations thereof, optionally including in the backbone 1 to 5 moieties selected from the group consisting of —O—, —C(O)—, —S—, —$SO_2$— and —$NR^1$— groups (and combinations thereof such as —C(O)—O—), wherein $R^1$ is hydrogen, or a $C_1$-$C_4$ alkyl group. In another embodiment, $R^8$ is a poly(alkylene oxide) moiety of the formula —($OCH_2CH_2$—)$_f$($OCH_2CH(R^1)$)$_g$—, wherein f is at least 5, g may be 0, and preferably at least 1, and the mole ratio of f:g is at least 2:1 (preferably at least 3:1), and $R^1$ is H or a $C_1$-$C_4$ alkyl.

Preferably, $R^8$ is a divalent alkylene, Y is a hydrolysable group, including alkoxy, acyloxy and halo; $R^9$ is a monovalent alkyl or aryl group, p is 1, 2 or 3, preferably 3.

Useful silane monomers include, for example, 3-(methacryloyloxy) propyltrimethoxysilane, 3-acryloxypropyltrimethoxysilane, 3-acryloyloxypropyltriethoxysilane, 3-(methacryloyloxy)propyltriethoxysilane, 3-(methacryloyloxy)propylmethyldimethoxysilane, 3-(acryloyloxypropyl) methyldimethoxysilane, 3-(methacryloyloxy)propyldimethylethoxysilane, 3-(methacryloyloxy) propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and mixtures thereof.

The optional silane monomers are used in amounts of 0 to 10, preferably 1-5, parts by weight, relative to 100 parts by weight total monomer of the first oligomer or the curable adhesive composition. Such optional silane monomers are used as adhesion promoters for improved bonding to metal, to silaceous surfaces, to surfaces having —OH groups, or as a self-crosslinking group for the curable composition.

The first oligomer further comprises polymerized monomer units having a polymerizable group. The first oligomer typically comprises at least 1 part by weight of monomer units having a free-radically photopolymerizable groups. The first oligomer typically comprises no greater than 10, 9, 8, 7, 6, or 5 parts by weight of monomer units having free-radically polymerizable groups. The number of functional groups per oligomer molecule typically averages at least 1, 1.25, or 1.5 and typically no greater than 4, or 3, or 2.5.

In favored embodiments, the polymerizable groups of the oligomer are pendent (meth)acrylate groups or terminal aryl ketone photoinitiator groups.

An ethylenically unsaturated polymerizable group, such as a pendent (meth)acrylate group, can be provided to the oligomer by an indirect route whereby a portion of the pendent hydroxyl groups of the oligomer are further functionalized by reaction with a co-reactive, electrophilic compound having an ethylenically unsaturated group—"co-reactive monomers".

The co-reactive functional group typically comprises a carboxyl, isocyanato, epoxy, anhydride, or oxazolinyl group, oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl(meth)acrylate; isocyanato-substituted compounds such as isocyanatoethyl(meth)acrylate and 4-isocyanatocyclohexyl(meth)acrylate; epoxy-substituted compounds such as glycidyl(meth)acrylate; aziridinyl-substituted compounds such as N-acryloylaziridine and 1-(2-propenyl)-aziridine; and acryloyl halides such as (meth)acryloyl chloride.

Co-Reactive Monomers can have the General Formula

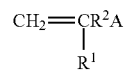

wherein $R^1$ is hydrogen, a $C_1$ to $C_4$ alkyl group, or a phenyl group, typically hydrogen or a methyl group; $R^2$ is a single bond or a (hetero)hydrocarbyl divalent linking group that joins an ethylenically unsaturated group to co-reactive functional group A and typically contains no greater than 34, or 18, or 10, carbon and, optionally, oxygen and nitrogen atoms and, when $R^2$ is not a single bond, $R^2$ is typically selected from

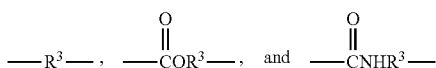

wherein $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a co-reactive functional group capable of reacting with pendent hydroxyl group of the oligomer for the incorporation of a free-radically polymerizable group.

In some embodiments, the monomer units having polymerizable group are pendent (meth)acrylate groups prepared by reaction of an oligomer having pendent hydroxyl groups with a (meth)acryloyl compound having co-reactive functional groups.

An alternate but direct method of incorporation of the pendent ethylenically unsaturated group is to include a polyethylenically unsaturated monomer (such as ethylene glycol diacrylate, propylene glycol dimethacrylate, trimethylolpropane triacrylate, or 1,6-hexamethylenedioldiacrylate) in the monomer mix. However, the use of such polyethylenically unsaturated monomers can lead to extensive branching and/or crosslinking. In some embodiments, the curable composition contains no polyethylenically unsaturated monomer or other crosslinking agents.

In some embodiments, the first oligomer is prepared and then subsequently functionalized with the pendent, polymerizable (e.g. ethylenically unsaturated) groups. That is, the acrylic ester monomer, hydroxyl functional monomer and optional other polar monomer are combined and polymerized to produce the hydroxyl functional oligomer.

The first oligomer may be prepared using radical polymerization techniques by combining an initiator and monomers in the presence of a chain transfer agent. In this reaction, a chain transfer agent transfers the active site on one growing chain to another molecule that can then start a new chain so the degree of polymerization may be controlled. The $M_w$ of the oligomer is typically at least 5, 6, 7, or 8K and typically no greater than 50K. In some embodiments, the $M_w$ of the oligomer is no greater than 40, 35, 30, 35, 20 or 15 k. It has been found if the degree of polymerization is too high, the composition is too high in viscosity, and not easily processible. Conversely, if the degree of polymerization is too low, the modulus, adhesion and other mechanical properties are diminished (at a constant degree of functionalization).

Chain transfer agents may be used when polymerizing the monomers described herein to control the molecular weight of the resulting oligomer. Suitable chain transfer agents include halogenated hydrocarbons (e.g., carbon tetrabromide) and sulfur compounds (e.g., lauryl mercaptan, butyl mercaptan, ethanethiol, and 2-mercaptoethyl ether, isooctyl thioglycolate, t-dodecylmercaptan, 3-mercapto-1,2-propanediol), and ethyleneglycol bisthioglycolate. The amount of chain transfer agent that is useful depends upon the desired molecular weight of the oligomer and the type of chain transfer agent. The chain transfer agent is typically used in amounts from about 0.1 parts to about 10 parts; or 0.1 to about 8 parts; or 0.5 parts to about 4 parts based on total weight of the monomers.

The monomers and optional chain transfer agent are combined and oligomerized in the presence of a chain transfer agent. More particularly, the first oligomer of the adhesive is prepared by the steps of:

(i) providing an essentially solvent-free mixture comprising the free radically polymerizable monomers supra and at least one free-radical polymerization initiator, (ii) partially polymerizing said mixture to provide a partially polymerized mixture (preferably) exhibiting a Brookfield viscosity of between 1,000 and 125,000 mPas at 20° C. and a degree of conversion of monomers to polymer of between 85-99 wt. %, preferably 90 to 98 wt. % with respect to the mass of the monomers prior to polymerization, (iii) converting a portion of the hydroxyl functional monomer units to pendent polymerizable (meth)acrylate groups, (iv) adding one or more photoinitiators and solvent diluent monomers (as well as any other optional components) to the partially polymerized mixture to provide a radiation-curable precursor, (iv) subsequently applying the radiation-curable precursor to a substrate, and (v) further polymerizing the radiation-curable precursor by subjecting it to actinic irradiation to provide said adhesive.

Alternatively the oligomer may comprise a terminal photoinitiator group by inclusion of an ethylenically unsaturated monomer comprising a photoinitiator group during the polymerization of the oligomer. In this embodiment, the first oligomer of the adhesive is prepared by the same method as described above except step iii) is omitted. One class of suitable monomers are (meth)acrylate monomers comprising a radiation sensitive aryl ketone group. Such monomers can have the general formula:

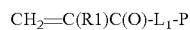

wherein R1 is hydrogen or methyl,
$L_1$ is a divalent linking atoms such as oxygen or a divalent linking group such as

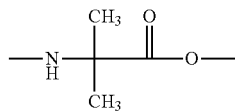

P can be a radiation sensitive aryl ketone group capable of Norrish Type I cleavage. Preferably P is selected from radiation sensitive groups having the formula:

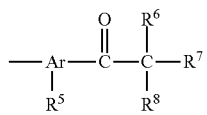

wherein Ar is an arylene group having 6 to 12 carbon atoms that can be substituted by a lower alkyl group having one to six carbon atoms, Ar preferably is selected from phenylene, naphthalenylene, and biphenylene; and $R^5$ is selected from the group consisting of hydrogen, $C_1$ to $C_{12}$ alkyl groups, $C_1$ to $C_{12}$ alkoxy groups, and phenyl groups;

$R^6$, $R^7$, and $R^8$ are independently selected from the group consisting of hydroxyl, $C_1$ to $C_{12}$ alkyl groups, $C_1$ to $C_{12}$ alkoxy groups, di($C_1$ to $C_{12}$) amino groups, and awl groups, provided that at least one of $R^6$, $R^7$, and $R^8$ is selected from the group consisting of hydroxyl, $C_1$ to $C_{12}$ alkoxy groups, or $C_1$ to $C_{12}$ amino groups, or that any two of $R^6$, $R^7$, and $R^8$ together can be an alkylene group, —$(C_pH_{2p})$—, or an alkylene-dioxy group, —O—$(C_pH_{2p})$—O—, in which p is an integer having a value of two or three, that together with the carbon atoms to which they are attached to form a 5- or 6-membered ring, or any two of $R^6$, $R^7$, and $R^8$ taken together with the carbon atom to which they are attached can form a carbonyl group —C(O)— provided that the remaining $R^6$, $R^7$, and $R^8$ are selected from the group consisting of hydroxyl, $C_1$ to $C_{12}$ alkoxy groups, $C_1$ to $C_{12}$ amino groups, and aryl groups.

In one embodiment, the (meth)acrylic acid monomer comprising a radiation sensitive aryl ketone group is 2-(propenoic acid 2-4-2 hydroxy-2-methyl-1-oxopropyl)phenoxy ethyl ester available from CIBA-GEIGY, Hawthorne, N.Y. under the trade designation "Darocure ZLI-331" Examples of acrylamido functional disubstituted acetyl awl ketone photoinitiators are described in U.S. Pat. No. 5,506,279; incorporated herein by reference.

When the oligomer comprises a photoinitiator group, step (iii) of converting a portion of the hydroxyl functional monomer units to pendent polymerizable (meth)acrylate groups is omitted during the preparation of the curable adhesive. Further, when the oligomer comprises a pendent photoinitiator group, the addition of another photoinitiator component can be optional.

The resulting radiation curable precursore polymer obtained by conversion of the monomers to polymer to a degree of between 85-99 wt. % which is comprised in the radiation-curable precursor, typically has a polydispersity $p=M_w/M_n$ between 1.5 and 4.

The mixture further comprises an effective amount of one or more free-radical polymerization initiators. The free-radical polymerization initiators and their amount and the polymerization conditions are selected to effect a partial polymerization of the mixture providing the required conversion of monomers to polymer to a degree of between 85-99 wt. % with respect to the mass of the monomers prior to polymerization, and a viscosity of the partially polymerized mixture of between 1,000-500,000 mPas at 20° C. The term "free-radical polymerization initiators" as used above and below includes initiators which can be thermally activated or activated by actinic radiation such as, in particular, UV-radiation.

One or more thermally activatable free-radical polymerization initiators are present during the polymerization of the monomers to form the oligomer. Suitable thermally activatable free-radical polymerization initiators include organic peroxides, organic hydroperoxides, and azo-group initiators which produce free-radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the Vazo™ (compounds manufactured by DuPont, such as Vazo™ 52 (2,2'-azobis(2, 4-dimethylpentanenitrile)), Vazo™ 64 (2,2'-azobis(2-methyl-propanenitrile)), Vazo™67 (2,2'-azobis(2-methylbutanenitrile)), and Vazo™88 (2,2'-azobis(cyclohexane-carbonitrile)).

The polymerization steps may occur as a single step, or multiple steps. That is, all or a portion of the monomers and/or the initiator may be initially charged and partially polymerized. In some embodiments, there is an initial charge of monomers and initiator that is partially polymerized, then additional monomer and/or initiator is added, then further polymerized. Such multiple polymerization steps 1) helps narrow the polydispersity of the reaction, specifically reducing the amount of low molecular weight chains formed and 2) minimize the heat of reaction and 3) allows one to adjust the type and amount of monomer available during polymerization.

The term "essentially adiabatic polymerization" as used above and below means that total of the absolute value of any energy exchanged to or from the reaction system in which the polymerization of the mixture to a degree of conversion of between 30-60 wt. % to provide the partially polymerized mixture, takes place, will be less than about 15% of the total energy liberated during said polymerization of the mixture.

The first oligomer may be prepared by reacting batch-wise, i.e. the polymerization reaction of the mixture occurs in a vessel where the partially cured mixture may be drained from the vessel at the end of the polymerization and not continuously during the reaction. The monomers and initiators and, optionally, additives can be charged to the vessel at one time prior to reacting, in steps over time while reacting, or continuously over a time period while reacting, and the polymerization reaction is allowed to proceed for the necessary amount of time to achieve the desired degree of conversions of said one or more monomers to polymer to a degree of between 85-99 wt. %.

The degree of conversion can be measured by standard analytical methods, including IR spectroscopy and gravimetric analysis. Additional details regarding the adiabatic reaction process may be found in U.S. Pat. No. 7,691,437 (Ellis et al.), incorporated herein by reference.

The first (e.g. intermediate) oligomer thus produced can have the general formula:

$$\sim[M^{Ester}]_a\text{-}[M^{OH}]_b\text{-}[M^{Polar}]_c\text{-}[M^{Silyl}]_e\sim, \text{ where}$$

—[$M^{Ester}$]—represents interpolymerized (meth)acrylate ester monomer units;

—[$M^{OH}$]—represents interpolymerized (meth)acryloyl monomer units having a pendent hydroxy group,

[$M^{Polar}$] represent optional polar monomer units, and

[$M^{Silyl}$] represent optional silane-functional monomer units.

Subscripts a, b, c and e represent the parts by weight of each monomer unit. It will be understood that the oligomeric product of the adiabatic process further comprises unreacted monomer due to the partial conversion.

As previously described, in some embodiments a portion of the hydroxyl functional monomer units, —[$M^{OH}$]—, are converted to [$M^{Poly}$] polymerizable olymerizable groups such as (meth)acryloyl monomer units having a pendent polymerizable (meth)acryloyl group or monomer units comprising a terminal (e.g. aryl ketone) photoinitiator group.

Either embodiment yields an oligomer of the formula:

$$\sim[M^{Ester}]_a\text{-}[M^{OH}]_b\text{*-}[M^{Poly}]_d\sim,$$

$$\sim[M^{Ester}]_a\text{-}[M^{OH}]_b\text{*-}[M^{Polar}]_c\text{-}[M^{Silyl}]_e\text{-}[M^{Poly}]_d\sim,$$

where

[M$^{Poly}$] represents monomer units comprising polymerizable groups. In some embodiments, [M$^{Poly}$] represent interpolymerized (meth)acryloyl monomer units having a pendent polymerizable (meth)acryloyl group, b* represents the parts by weight of the hydroxyl-functional monomer remaining after functionalization to produce and d represents the parts by weigh of the monomer units having pendent, free radically polymerizable monomer units. It will be apparent that b*+d will equal the value of b in the starting oligomer. Further, when [M$^{Poly}$] is a terminal (e.g. aryl ketone) photoinitiator group, b=b*.

The oligomer comprises 1 to 10 wt. % of (meth)acrylate groups and/or photoinitiator groups for subsequent photopolymerization. The oligomer typically comprises at least 10 wt. %, 15 wt. %, or 20 wt. %, of the hydroxyl functional monomer units (that have not been functionalized with a (meth)acrylate group) so as to avoid the cloud point problems in humid environments.

For embodiments wherein the oligomer does not comprise photoinitiator groups, the oligomeric mixture comprising the second component is combined with a photoinitiator. Additional diluent monomer is typically also added. The diluents monomers can be used to adjust the viscosity of the composition. Typically the total amount of diluent monomer is less than 50, 40, 30 and in some embodiments, less than 25, 20, 15, 10, or 5 wt-% of the curable adhesive composition.

The diluent monomers may be the same monomers previously described for use in preparing the oligomer. In some embodiments, the diluents monomer comprises
80 to 100 part (e.g. low Tg) (meth)acrylate ester monomers;
0 to 20 parts by weight of hydroxy-functional monomers;
0 to 5 parts by weight of polar monomers;
0 to 2 parts by weight of silyl functional monomers, wherein the sum of the monomer is 100 parts by weight.

In some embodiments the hydroxyl-functional monomer is used in amounts such the curable composition (oligomer+diluent) has a hydroxyl content greater than greater than $6.5 \times 10^{-4}$ mol OH/g or greater than $8.3 \times 10^{-4}$ mol OH/g.

The curable composition typically comprises photoinitiator as a separate component and/or as a polymerizable group of the oligomer.

The term "photoinitiator" as used above and below comprises free-radical polymerization initiators which can be activated by some kind of actinic radiation such as for example, light sources, especially UV-light sources, or e-beam sources. Activation by light sources and, especially, UV-light sources is preferred. Free-radical radiation polymerization initiators which can be activated by light, are often referred to as free-radical photoinitiators. Suitable free-radical photoinitiators include both type I and type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, alpha-dialkoxyacetophenones, alpha-hydroxyalkylphenones and acylphosphine oxides. Suitable type I photoinitiators are commercially available, for example, as Esacure™ KIP 100 from Lamberti Spa, Gallarate, Italy, or as Irgacure™ 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators include amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure™ TZT from Lamberti Spa., Gallarate, Italy, or as 2- or 3-methylbenzophenone from Aldrich Co., Milwaukee, Wis. Suitable amine co-initiators are commercially available, for example, as GENOMER™ 5275 from Rahn AG, Zurich, Switzerland.

Photoinitiators may be used in the liquid compositions when curing with UV-radiation. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN™ TPO-L from BASF Corp. or 1-hydroxycyclohexyl phenyl ketone available as IRGACURE™ 184 from Ciba Specialty Chemicals.

The total amount of photoinitiators and, optionally, of one or more co-initiators typically is in the range of about 0.001 wt. % to about 5 wt. % and typically in the range of about 0.1 wt. % to about 3 wt. % with respect to the mass of the curable composition.

The radiation-curable precursor (oligomer, second components and diluent) has a viscosity of between 1,000 to 500,000 mPas. In some embodiments, the viscosity is at least 1500 or 2000 mPas and no greater than 125,000 mPas, or 75,000 mPas, or 50,000 mPas at 25° C. In some embodiments, the viscosity is no greater than 40,000, or 30,000, or 20,000, or 10,000, or 5,000 mPas at 25° C.

The curable adhesive composition is prepared by providing the first oligomer comprising (meth)acrylate ester monomer units, hydroxyl-functional monomer units, and monomer units having polymerizable groups. The first oligomer is typically provided as a solute oligomer dissolved in a diluent monomer component. The method further comprises combining the first oligomer, the second component comprising $C_2$-$C_4$ alkylene oxide repeat units and polymerizable terminal groups, and diluent monomer component. Thus, the oligomer is preformed prior to combining with the second component. The diluent monomer typically comprises the same monomers utilized to form the solute oligomer (or a portion thereof). The diluent monomer may alternatively comprise other monomers.

The curable adhesive composition generally comprises greater than 50 wt. % of the first oligomer and 0.5 to 50 wt-% of the second component. In favored embodiments, the adhesive comprises at least 55, 60, 65, or 70 wt-% of the first oligomer and at least no greater than 45, or 40, or 35, or 30, or 25 wt-% of the second component. By minimizing the concentration of the second component adhesion can be improved while maintaining the beneficial properties contributed by the first oligomer. For example, the shrinkage of the cured adhesive composition can be less than 2% when the concentration of second component is sufficiently low. In some embodiments, the adhesive composition comprises at least 1, 2, 3, 4 or 5 wt-% of the second component and no greater than 24, 23, 22, 21, or 20 wt-% of the second component.

The curable adhesive composition comprising the first oligomer, second component, diluents monomer(s) and photoinitiator is thoroughly mixed and subsequently applied to a substrate in the step (iv). Because of its low viscosity the composition can be applied to a substrate by conventional coating methods such as knife-coating, gravure coating, curtain coating, air knife coating and roll-coating. In some embodiments the curable composition is applied by dispensing a fixed amount of adhesive over the bonding area. This may be applied by applying dots and/or lines via a needle, needle die or slot die. The entire area may be coated by spray coating, die coating, draw bar coating or curtain coating. A "dam and fill" method may be used, precuring a dam of liquid optically clear adhesive around the perimeter of the bonding area and then filling the bonding area using any of the methods described above. The dam may also be in the form of a tape, or a foam and/or rubber gasket. The area may be coated using stencil printing or screen printing without the aid of a dam. Additional information regarding these deposition methods may be found in WO 2011/119828, WO 2011/84405, U.S. 2010/0265444 and U.S. 2009/0283211 (Busman et al.), incorporated herein by reference.

Subsequent to its application to a substrate the precursor is further polymerized in step (v) by subjecting it to actinic irradiation and preferably to UV-irradiation. Actinic radiation from any source and of any type can be used for the curing of the composition whereby light sources are preferred over e-beam sources. The light can be in the form of parallel rays or divergent beams. Since many photoinitiators generating free-radicals exhibit their absorption maximum in the ultraviolet (UV) range, the light source is preferably selected to emit an effective amount of such radiation. Suitable light sources include carbon arc lamps, mercury vapor lamps, fluorescent lamps comprising ultraviolet light-emitting phosphors, ultraviolet light-emitting diodes, argon glow lamps and photographic flood lamps. Preferred are high-intensity light sources having a lamp power density of at least 80 mW/cm$^2$ and more preferably of at least 120 mW/cm$^2$.

When subjecting the curable composition to actinic irradiation and, in particular, to UV-irradiation, the precursor is cured via a free-radical polymerization mechanism. The composition is termed as "fully cured" when the conversion of the oligomer and diluents monomers to polymer is at least 90%, more preferably at least 95%, especially preferably at least 97.5% and most preferably at least 99%.

The energy density applied is typically 100-5,000 mJ/cm$^2$ and more typically 300-3000 mJ/cm$^2$ for curing a 250 μm thick layer of the radiation-curable composition.

The curable composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 or 15 mW/cm$^2$ to 450 mW/cm$^2$.

Further components and additives may optionally be included into the curable composition such as, for example, heat stabilizers, antioxidants, antistatic agents, thickeners, fillers, pigments, dyes, colorants, thixotropic agents, processing aides, nanoparticles, fibers and any combination thereof in amounts such that the optical properties of the adhesive are not significantly compromised. Such additives are generally in an amount of between 0.01 and 10 wt. % and more typically in an amount of between 0.05 and 5 wt. % with respect to the mass of curable composition. In some embodiment the curable composition and subsequent adhesive contain no such additives.

In some embodiments the curable composition may further comprise metal oxide particles to modify the refractive index of the adhesive layer or the viscosity of the liquid adhesive. Metal oxide particles that are substantially transparent may be used. Metal oxide particles may be used in an amount needed to produce the desired effect, for example, in an amount from about 1 to about 10 weight percent, from about 3.5 to about 7 weight percent, from about 10 to about 85 weight percent, or from about 40 to about 85 weight percent, based on the total weight of the curable composition. Metal oxide particles may only be added to the extent that they do not add undesirable color, haze or transmission characteristics. Generally, the particles can have an average particle size of from about 1 nm to about 100 nm.

The metal oxide particles can be surface treated to improve dispersibility in the adhesive layer and the composition from which the layer is coated. Examples of surface treatment chemistries include silanes, siloxanes, carboxylic acids, phosphonic acids, zirconates, titanates, and the like. Techniques for applying such surface treatment chemistries are known.

In some embodiments, the adhesive layer comprises a fumed silica. Suitable fumed silicas include, but are not limited to: AEROSIL™ 200; AEROSIL™ R805; and EVONIK™ VP NKC 130 (both available from Evonik Industries); CAB-O-SIL™ TS 610; and CAB-O-SIL™ T 5720 (both available from Cabot Corp.), and HDK™ H20RH (available from Wacker Chemie AG). In some embodiments, the adhesive layer comprises a fumed aluminum oxide, such as AEROXIDE™ ALU 130 (available from Evonik, Parsippany, N.J.). In some embodiments, the adhesive layer comprises clay such as GARAMITE™ 1958 (available from Southern Clay Products).

In some embodiments, the liquid optically clear adhesive comprises non-reactive oligomeric rheology modifiers. While not wishing to be bound by theory, non-reactive oligomeric rheology modifiers build viscosity at low shear rates through hydrogen bonding or other self-associating mechanisms. Examples of suitable non-reactive oligomeric rheology modifiers include, but are not limited to: polyhydroxycarboxylic acid amides (such as BYK 405, available from Byk-Chemie GmbH, Wesel, Germany), polyhydroxycarboxylic acid esters (such as BYK R-606™, available from Byk-Chemie GmbH, Wesel, Germany), modified ureas (such as DISPARLON 6100™, DISPARLON 6200™ or DISPARLON 6500™ from King Industries, Norwalk, Conn. or BYK 410™ from Byk-Chemie GmbH, Wesel, Germany), metal sulfonates (such as K-STAY™ 501 from King Industries, Norwalk, Conn. or IRCOGEL 903™ from Lubrizol Advanced Materials, Cleveland, Ohio), acrylated oligoamines (such as GENOMER 5275™ from Rahn USA Corp, Aurora, Ill.), polyacrylic acids (such as CARBOPOL 1620™ from Lubrizol Advanced Materials, Cleveland, Ohio), modified urethanes (such as K-STAY 740™ from King Industries, Norwalk, Conn.), micronized amide waxes (such as CRAYVALLAC SLT™ from Arkema), micronized amide modified castor oil waxes (such as CRAYVALLAC MT™ from Arkema), micronized castor oil derived waxes (such as CRAYVALLAC ANTISETTLE CVP™ from Arkema), pre-activated amide wax dispersed in (meth)acrylate monomers (such as CRAYVALLAC E00054) or polyamides. In some embodiments, non-reactive oligomeric rheology modifiers are chosen to be miscible and compatible with the optically clear adhesive to limit phase separation and minimize haze.

In some embodiments, the adhesive layer may be formed from a thixotropic liquid optically clear adhesive. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under low shear rate conditions. The main advantage of thixotropic behavior over simply high viscosity is that high viscosity adhesive is difficult to dispense and to flow during application. Adhesive compositions can be made thixotropic by adding particles to the compositions. In some embodiments, fumed silica is added to impart thixotropic properties to a liquid adhesive, in an amount of from about 2 to about 10 wt. %, or from about 3.5 to about 7 wt. %.

In some embodiments, the curable composition optionally comprises a thixotropic agent. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under low shear rate conditions. The main advantage of thixotropic behavior over simply high viscosity is that high viscosity adhesive is difficult to dispense and to flow during application. Adhesive compositions can be made thixotropic by adding particles to the compositions. In some embodiments, fumed silica is added to impart thixotropic properties to a liquid adhesive, in an amount of from about 2 to about 10 weight percent, or from about 3.5 to about 7 weight percent. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, monomers or oligomers may disrupt the thixotropic or optical performance In some embodiments, the curable composition contains no acid-functional monomers or oligomers.

In some embodiments, any liquid optically clear adhesive having a viscosity of no more than 30 Pa·s, between about 2 and about 30 Pa·s and particularly between about 5 and about 20 Pa·s at a shear rate of 1 to 10 sec$^{-1}$ can be combined with a thixotropic agent to form a thixotropic liquid optically clear adhesive suitable for stencil printing or screen printing. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, acid or hyxdroxyl containing monomers or oligomers may disrupt the thixotropic or optical performance.

The curable composition optionally comprises a plasticizer that increases its softness and flexibility to the resultant adhesive. Plasticizers are well known and typically do not participate in polymerization of (meth)acrylate groups. The plasticizer may comprise more than one plasticizer material. The adhesive may comprise from greater than 1 to about 20 weight percent, or from greater than 3 to about 15 weight percent, of the plasticizer. The particular plasticizer used, as well as the amount used, may depend on a variety of factors.

The curable composition may comprise a tackifier. Tackifiers are well known and are used to increase the tack or other properties of an adhesive. There are many different types of tackifiers but nearly any tackifier can be classified as: a rosin resin derived from wood rosin, gum rosin or tall oil rosin; a hydrocarbon resin made from a petroleum-based feedstock; or a terpene resin derived from terpene feedstocks of wood or certain fruits. The adhesive layer may comprise, e.g., from 0.01 to about 20 weight percent, from 0.01 to about 15 weight percent, or from 0.01 to about 10 weight percent of tackifier. The adhesive layer may be free of tackifier.

The adhesive resulting from photopolymerization of the curable composition is desirably optically clear initially and after accelerated aging. As used herein, the term "optically clear" refers to a material that has a luminous transmission of greater than about 90 percent, a haze of less than about 2 or 1.5 percent, in the 350 to 800 nm wavelength range. In preferred embodiments, the haze is less than 1 or 0.5 percent. Further, the opacity is typically less than about 1 percent. Both the luminous transmission and the haze can be determined using, for example, ASTM-D 1003-95. Typically, the optically clear adhesive may be visually free of bubbles.

The adhesive resulting from photopolymerization of the curable composition is desirably non-yellowing initially and after accelerated aging. For example, the CIELAB b* is typically less than 1.5, or 1.0 or 0.5 for a thickness of 10 mils (about 250 microns).

The adhesive layer desirably maintains optical clarity, bond strength, and resistance to delamination over the lifetime of the article in which it is used. Whether an adhesive will likely have these desirable characteristics can be determined using an accelerated aging test. The adhesive layer can be positioned between two substrates for this test. The resulting laminate is then exposed to elevated temperatures, optionally, combined with elevated humidity conditions, for a period of time. For example, the adhesive layer can often retain its optical clarity after aging at 85° C. for approximately 500 hours without humidity control (i.e., the relative humidity in the oven is usually below about 10 percent or below about 20 percent). In favored embodiments, the adhesive can often retain its optical clarity after aging at 65° C. for approximately 72 hours with a relative humidity of about 90 percent. In more favored embodiments, the cloud point resistant adhesive can often retain its optical clarity after aging at 65° C. for approximately 72 hours with a relative humidity of about 90 percent and rapid (i.e. within minutes) cooling to ambient conditions. After aging, the average transmission of the adhesive between 350 nanometers (nm) and 800 nm can be greater than about 85 percent and the haze can be less than about 2 percent.

The adhesive resulting from photopolymerization of the curable composition desirably has a shear modulus of 5000 to 1,000,000 pascals. In some embodiments, the shear modulus is no greater than 100,000; 75,000; or 50,000 pascals.

Laminates are provided that include an optical film or optically clear substrate and a optically clear adhesive layer adjacent to at least one major surface of the optical film or substrate.

The optically clear adhesive has a thickness of at least 25 microns and typically no greater than 5, 4, 3, 2, or 1 mm (i.e. 1000 microns). In some embodiments, the thickness of the adhesive is greater than 50 microns. In some embodiments, the thickness is no greater than 750 or 500 microns.

The articles can further include another substrate (e.g., permanently or temporarily attached to the adhesive layer), another adhesive layer, or a combination thereof. As used herein, the term "adjacent" can be used to refer to two layers that are in direct contact or that are separated by one or more thin layers, such as primer or hard coat or other surface coating(s). Often, adjacent layers are in direct contact. Additionally, laminates are provided that include an adhesive layer positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, a plasma display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, cellulose triacetates, as well as cycloolefin polymers such as ZEONEX and ZEONOR from Zeon Chemicals LP, Louisville, Ky. Typically, cover lenses can be made of glass, polymethyl methacrylates, or polycarbonate.

The laminates have at least one of the following properties: the adhesive layer has optical transmissivity over a useful lifetime of the article, the adhesive can maintain a sufficient bond strength between layers of the article, the adhesive can resist or avoid delamination, and the adhesive can resist bubbling of the adhesive layer over a useful lifetime. The resistance to bubble formation and retention of optical transmissivity can be evaluated using accelerated aging tests.

The curable adhesive compositions may be applied directly to one or both sides of an optical element such as a polarizer. The polarizer may include additional layers such as an anti-glare layer, a protective layer, a reflective layer, a phase retardation layer, a wide-angle compensation layer, and a brightness enhancing layer. In some embodiments, the curable adhesives described herein may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

EXAMPLES

| Materials | |
|---|---|
| Abbreviation or Trade Name | Description |
| IOA | Isooctyl acrylate, available under the trade designation "SR440" from Sartomer USA, LLC, Exton, Pennsylvania. |
| TDA | Tridecyl Acrylate, available under the trade designation "SR489D" from Sartomer USA. |
| 4-HBA | 4-Hydroxybutyl acrylate, available under the trade designation "4-HBA" from San Esters Corporation, New York, New York. |
| 2-HEA | 2-Hydroxyethyl acrylate, available from BASF, Florham Park, NJ |
| IEM | Isocyanatoethyl methacrylate, available from Showa Denko, Kanagawa, Japan. |
| EGBTG | Ethylene glycol bisthioglycolate chain transfer agent, available from Evans Chemitics LP, Teaneck, New Jersey. |
| IOTG | Isothiolglycolate chain transfer agent |
| VAZO 52 | 2,2'-Azobis(2,4-dimethylpentanenitrile), available under the trade designation "VAZO 52" from E. I. du Pont de Nemours and Co., Wilmington, Delaware. |
| VAZO 67 | 2,2'-Azobis(2-methylbutyronitrile), available under the trade designation "VAZO 67" from E.I. du Pont de Nemours and Co., Wilmington, Delaware |
| VAZO 88 | 1,1'-Azobis(cyanocyclohexane), available under the trade designation "VAZO 88" from E. I. du Pont de Nemours and Co. |
| L130 | 2,5-Dimethyl-2,5-di-(tert-butylperoxy)hexyne-3 thermal initiator, available under the trade designation "Lupersol 130" from Pennwalt Corporation, Buffalo, New York. |
| DAROCUR ZLI-3331 | 2-(propenoic acid 2-4-2 hydroxy-2-methyl-1-oxopropyl)phenoxy ethyl ester available from CIBA-GEIGY, Hawthorne, NY |
| AO503 | Propanoic acid,3,3'-thiobis-, 1,1'-ditridecyl ester available from Adeka Corporation, Japan |
| TPO-L | Ethyl(2,4,6-trimethylbenzoyl)phenyl phosphinate, available under the trade designation "Lucirin TPO-L" from BASF Corporation, Florham Park, New Jersey. |
| A174 | 3-methacryloxypropyltrimethoxysilane, available under the trade designation "Silquest A-174" from Momentive, Columbus, Ohio. |
| IRG 1076 | Octadecyl-3-(3,5-di-tert.butyl-4-hydroxyphenyl)-propionate, a phenolic primary antioxidant available under the trade designation "IRGANOX 1076" from Ciba Specialty Chemicals, Inc. |
| MEHQ | Monomethyl ether hydroquinone |

Test Methods
Viscosity Measurement

Viscosity measurements were made by using an AR2000 Rheometer equipped with a 40 mm, 1° stainless steel cone and a plate available from TA Instruments, New Castle, Del. Viscosities were measured at 25° C. using a steady state flow procedure with a frequency from 0.001 to 100 sec$^{-1}$ with a 28 μm gap between the cone and the plate. Viscosity values are reported in centipoise (cps) at a shear rate of 1 sec$^{-1}$.

Molecular Weight Determination

The molecular weight distribution of the compounds was characterized using conventional gel permeation chromatography (GPC). The GPC instrumentation, which was obtained from Waters Corporation, Milford, Mass., included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns available from Varian Inc, Palo Alto, Calif.

Samples of polymeric solutions were prepared by dissolving polymer or dried polymer samples in tetrahydrofuran at a concentration of 0.5 percent (weight/volume) and filtering through a 0.2 micron polytetrafluoroethylene filter that is available from VWR International, West Chester, Pa. The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Pluck Adhesion

Two float glass slides, 2¼ inch (5.72 cm)×1 3/16 inch (4.60 cm)×¼ inch (0.635 cm) were cleaned with isopropyl alcohol (IPA). Two layers of SCOTCH Filament Tape 898, available from the 3M Company, St. Paul, Minn., were attached along the two, 1 3/16 inch (4.60 cm) length edges of the first substrate in order to control the thickness of the adhesive composition, once it was placed on the slide. The tape created a step height of about 340 microns. The adhesive composition was dispensed by a pipette in the center of the slide and the second slide was slowly brought into contact with the first slide. The adhesive composition between the slides was cured with the total energy of 3,000 mJ/cm$^2$ in UV-A or 2,880 mJ/cm$^2$ in UV-B region under a Fusion UV lamp available from Fusion UV Systems Inc., Gaithersburg, Md., using a quartz UV D-bulb (Examples 1-4) or UV-H-bulb (Example 5), respectively. Samples then dwelled for one day in a controlled temperature-humidity (CTH) room at a temperature of 74° F. (23.3° C.) and a relative humidity of 50% prior to testing.

A glass slide with cured adhesive was loaded into a sliding pluck fixture on an MTS INSIGHT Electromechanical Test System with a 5 kN load cell available from MTS Systems Corporation, Eden Prairie, Minn. The samples were pulled apart at 25 mm/min and tested to failure. The first measured peak load was then divided by the measured area of the adhesive composition on the pluck sample to determine the pluck adhesion, measured in N/cm$^2$. At least three samples were tested for each adhesive composition, with an average value for pluck adhesion reported.

Shrinkage

Percent volume shrinkage was measured using an Accupyc II 1340 Pycnometer from Micromeritics Instrument Corporation, Norcross, Ga. An uncured adhesive composition sample of known mass was placed in the silver vial of the pycnometer. The vial was placed in the pycnometer and the volume of the sample was measured and the density of the adhesive composition was determined based on the volume and mass of the sample. The density of a cured adhesive composition was measured following the same procedure as that of the uncured. Cured adhesive compositions were prepared by casting a hand spread coating of the adhesive composition between two release liners, using an 11 mil (0.28 mm) thickness adjuster, and curing with the total energy of 2,450 mJ/cm$^2$ in UV-B region under a Fusion UV lamp with a quartz UV H bulb available from Fusion UV Systems Inc.

Volume shrinkage was then calculated from the following equation:

$$\{[(1/\text{Avg Liquid Density})-(1/\text{Avg Cured Density})]/(1/\text{Avg Liquid Density})\}\times 100\%$$

Optical Measurements

Optical properties of the adhesive compositions were measured by sandwiching the adhesive composition between two 2 inch (5.08 cm)×3 inch (7.62 cm)×200 microns LCD glass panels, EAGLE 2000 available from Specialty Glass Products, Willow Grove, Pa. The adhesive composition was cured with a total energy of 3,000 mJ/cm$^2$ in UV-A region using a Fusion UV lamp with a quartz UV D bulb (Example 1 through 4), and with a total energy of 3,200 mJ/cm$^2$ in UV-B region using a Fusion UV lamp with a quartz UV H bulb (Example 5), available from Fusion UV Systems Inc. The thickness of the adhesive composition was controlled by applying two layers of SCOTCH Filament Tape 898, 3M Company, along the two, 2 inch (5.08 cm) edges of one of the panels. Haze, transmission and color of the cured LOCAs were measured before and after aging under environmental testing conditions using a HunterLab UltraScan PRO available from Hunter Associates Laboratory, Inc, Reston, Va.

Modulus Measurements

To measure modulus, a TA Instruments ARES G2 rheometer was utilized capturing shear mechanical properties through a temperature ramp at a fixed frequency (commonly called DMA). The liquid composition is coated between two release liners with a thickness of 10 mil. The samples are then cured with 4000 mW/cm2 Fusion D irradiation to a total cure energy of 3 J/cm2. Cured samples are punched with an 8 mm diameter punch. An air powered press is used to punch out samples.

To run the test, an 8 mm flat aluminum plate is used on both sides of the sample on the rheometer. One liner is removed first using the tweezers. Then the sample is applied to the lower fixture and rubbed down with a thumb or fingers. It is important to align the sample with the fixture, to have them overlap nicely. The other side liner of this first piece is removed using the tweezers. A second sample is then applied to the upper fixture in the same manner.

When the sample has been laid up, the upper fixture is brought closer to the sample by manually using the up/down buttons on the instrument. Once the upper fixture and lower fixtures are in contact but not compressing the samples, the oven door chamber is closed and the test is then executed. The chamber is cooled to −50° C. The test sweeps upward from −50° C. to 125° C. at 3° C. per minute with the instrument measuring modulus at 1 Hz. Modulus is reported at 25° C. and the glass transition temperature is reported as the maximum value of tan delta.

Preparation of First (Meth)acryolyl Oligomers (RO-1)

270.5 g of TDA, 73.5 g of HBA, and 8.75 g of EGBTG were added to a four neck flask equipped with a reflux condenser, thermocouple, mechanical stirrer, and a gas inlet that allows both nitrogen or air to be bubbled into the solution. The first charge of thermal initiators Vazo 52 (0.0158 g), Vazo 88 (0.0158 g), and Lupersol 130 (0.0158 g) were also added to the flask. The mixture was stirred and heated to 60° C. under nitrogen. The temperature of the reaction mixture quickly exothermed and peaked at around 160° C. during the polymerization. After the reaction peak, the second charge of Vazo 88 (0.0158 g) dissolved in an additional 3 grams of TDA was added to the flask. The reaction vessel was held at 160° C. for 90 minutes before cooling to 100° C. and purging with air.

8.75 g of IEM was then added to the batch to react with the pendant hydroxyl groups on the IOA/HEA oligomer chains, incorporating methacrylate functional groups to the polymer. The reactor vessel was held at 100 C for 4 hours and then cooled and drained. A sample was taken at the end of this reaction period for oligomer molecular weight determination by GPC. A similar procedure was undertaken for each subsequent reactive oligomer preparation using the components and amounts (mass in grams) described in the following table. The wt-% of each of the components of the oligomer is in parenthesis for each component.

| Component | RO-1 | RO-2 | RO-3 | RO-4 |
|---|---|---|---|---|
| IOA | | 267 (97.25%) | 247 (91.21%) | |
| TDA | 270.5 g (75.12%) | | | 77 g (70.83%) |
| HBA | 73.5 (20.07%) | | | 23 g (21.16%) |
| HEA | | | 20 (7.38%) | |
| ZLI-3331 | | 5.24 (1.90%) | 2.5 (0.92%) | |
| EGBTG | 8.75 (2.39%) | 2.25 (0.82%) | 1.25 (0.46%) | 4.4 g (4.05%) |
| VAZO 52 | 0.0158 (0.004%) | 0.0125 (0.004%) | 0.0125 (0.004%) | 0.035 g (0.019%) |
| VAZO 67 | | | | 0.006 g (0.006%) |
| VAZO 88 | 0.0316 (0.008%) | 0.0250 (0.009%) | 0.0250 (0.009%) | 0.006 g (0.006%) |
| L 130 | 0.0158 (0.004%) | 0.0125 (0.004%) | 0.0125 (0.004%) | |
| MEGQ | MEGQ | | | 0.02 g (0.02%) |
| IEM | 8.75 (2.39%) | 0 | 0 | 4.25 g (3.91%) |
| Mw (Dal) | 13000 | | 22000 | |

The reactive oligomers were utilized as components of the following liquid optical adhesive compositions. The wt-% of each of the components of the curable adhesive composition is in parenthesis for each component.

The liquid optical adhesive formulations were prepared by charging the materials into a white mixing container (from FlackTek Inc., Landrum, S.C.), and mixed using a Hauschild Speedmixer™ DAC 150 FVZ, from FlackTek Inc., operating at around 3400 rpm for total 6 minutes.

| Material | Control Example A | Example 1 | Example 2 | Example 3 | Example 4 | Example 5 | Example 6 | Control Example B |
|---|---|---|---|---|---|---|---|---|
| RO-1 | 30.02 (87.87%) | 30.02 (87.00%) | 30.02 (83.00%) | 30.02 (77.99%) | 30.02 (73.03%) | | | |
| RO-3 | | | | | | 13.01 (67.04%) | | |
| RO-2 | | | | | | | | 14.991 (59.82%) |
| RO-4 | | | | | | | 78.84 (78.84%) | |
| UPICA 8966A | | 0.34 (0.98%) | 1.80 (4.97%) | 3.84 (9.97%) | 6.15 (14.96%) | 4.42 (22.77%) | 15.00 (15.00%) | 5.053 (20.15%) |
| TDA | 3.09 (9.04) | 3.09 (8.95%) | 3.25 (8.98%) | 3.45 (8.96%) | 3.68 (8.95%) | | 3.63 (3.63%) | |
| IOA | | | | | | 1.95 (10.04%) | | 4.994 (19.91%) |
| Irg 1076 | 0.34 (0.99%) | 0.34 (0.98%) | 0.35 (0.96%) | 0.38 (0.98%) | 0.40 (0.97%) | | 0.73 (0.73%) | |
| AO503 | 0.34 (0.99%) | 0.34 (0.98%) | 0.35 (0.96%) | 0.38 (0.98%) | 0.40 (0.97%) | | 0.73 (0.73%) | |
| TPO-L | 0.34 (0.99%) | 0.34 (0.98%) | 0.36 (0.99%) | 0.38 (0.98%) | 0.41 (0.99%) | | 0.73 (0.73%) | |
| A174 | 0.034 (0.099%) | 0.034 (0.098%) | 0.036 (0.099%) | 0.038 (0.098%) | 0.041 (0.099%) | 0.024 (0.123%) | 0.36 (0.36%) | 0.026 (0.103%) |

The formulations were tested according to the previously described test methods. With the exception of viscosity, the formulations were tested after curing under D-bulb, in UV-A region, with 3 J/cm². Curing energies were adjusted using the testing substrates (i.e. LCD glass, window glass or T-10 release liner) over the detector in the power puck.

|  | Control Example A 85° C. | | Example 1 85° C. | | Example 2 85° C. | | Example 3 85° C. | | Example 4 85° C. | |
| --- | --- | --- | --- | --- | --- | --- | --- | --- | --- | --- |
| Time (h) | Initial | 948 | Initial | 948 | Initial | 948 | Initial | 948 | Initial | 948 |
| L | 96.8 | 96.7 | 96.6 | 96.7 | 96.8 | 96.8 | 96.8 | 96.6 | 96.6 | 96.7 |
| a* | −0.04 | −0.05 | −0.07 | −0.07 | −0.04 | −0.07 | −0.05 | −0.09 | −0.05 | −0.08 |
| b* | 0.28 | 0.37 | 0.30 | 0.33 | 0.28 | 0.35 | 0.29 | 0.41 | 0.32 | 0.41 |
| % Haze | 0.2 | 0.1 | 0.2 | 0.1 | 0.3 | 0.1 | 0.2 | 0.1 | 0.3 | 0.1 |
| % T | 91.3 | 91.1 | 91.0 | 90.9 | 91.3 | 91.1 | 91.3 | 90.6 | 90.9 | 90.9 |
| Modulus (Pa) | 17300 | | 18000 | | 25600 | | 27500 | | 45500 | |
| Viscosity (cps) | 2949 | | 3162 | | 3152 | | 3021 | | 3133 | |
| Pluck Adhesion (N/cm²) | 76.4 | | 98.5 | | 108.3 | | 130.3 | | 114.2 | |
| Shrinkage (%) | 0.91 | | | | | | 1.53 | | | |

| Time (h) | Example 5 Initial | Control Example B Initial |
| --- | --- | --- |
| L | 96.7 | 96.5 |
| a* | −0.07 | −0.06 |
| b* | 0.37 | 0.41 |
| % Haze | 0.0 | 1.2 |
| % T | 90.6 | 90.0 |
| Shrinkage (%) | 2.7 | Not Measured* |
| Viscosity (cps) | 2600 | Not Measured |
| Pluck Adhesion (N/cm²) | 163.9 | Not Measured |

Since Control B was deemed too cloudy, no further testing was conducted. The modulus of Example 5 was not measured in view of having an insufficient amount to conduct such test.

What is claimed is:

1. A curable adhesive composition comprising:
   a) a first oligomer comprising;
      i. greater than 50 parts by weight of (meth)acrylate ester monomer units derived from alkanols having an average carbon number of $C_4$-$C_{18}$,
      ii. hydroxyl-functional monomer units,
      iii. monomer units having polymerizable groups wherein the polymerizable groups are pendent (meth)acrylate groups or terminal aryl ketone photoinitiator groups,
   b) a second component having the general formula:

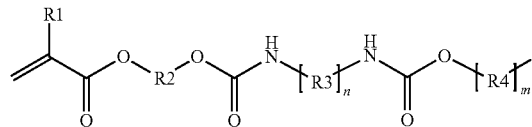

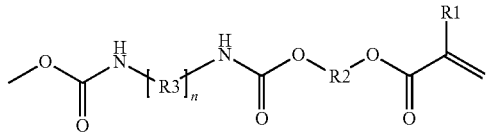

wherein R1 is hydrogen or methyl,
R2 is alkylene, arylene, or alkarylene,
for each m, R4 is independently a $C_2$-$C_4$ alkylene oxide repeat units,
m ranges from 5 to 100; and
R3 is independently a residue of a diisocyanate, n=1 and
   c) a diluent monomer component.

2. The curable adhesive composition of claim 1 wherein the polymerizable groups of the monomers units of the first oligomer are free-radically photopolymerizable groups.

3. The curable adhesive composition of claim 1 wherein R4 is $C_3$ alkylene oxide repeat units.

4. The curable adhesive composition of claim 1 wherein the second component has a number average molecular weight of no greater than 15,000 g/mole.

5. The curable adhesive composition of claim 1 wherein R3 independently comprises the residue of a cyclic aliphatic diisocyanate.

6. The curable adhesive composition of claim 1 wherein the adhesive composition comprises greater than 50 wt. % of the first oligomer and 0.5 to 50 wt-% of the second component.

7. The curable adhesive composition of claim 1 comprising less than 20 wt-% of the diluent monomer component.

8. The curable adhesive composition of claim 1 wherein the hydroxyl functional monomer has the general formula:

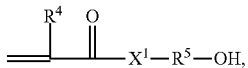

wherein
$R^5$ is a (hetero)hydrocarbyl group;
$R^4$ is —H or $C_1$-$C_4$ alkyl; and
$X^1$ is —$NR^4$— or —O—.

9. The curable adhesive composition of claim 1 wherein the monomer units having polymerizable group are pendent (meth)acrylate groups prepared by reaction of an oligomer having pendent hydroxyl functional groups with an acryloyl compound having co-reactive functional groups.

10. The curable adhesive composition of claim 1 wherein the monomer units having polymerizable groups comprise a (meth)acrylate compound comprising the terminal aryl ketone photoinitiator groups.

11. The curable adhesive composition of claim 1 wherein the first oligomer comprises 3 to 49 parts by weight of the hydroxyl-functional monomer units and 1 to 10 parts by weight of the monomer units having polymerizable groups.

12. The curable adhesive composition of claim 1 wherein the diluent monomer component comprises at least one monomer selected from acrylate ester monomer units, hydroxyl-functional monomer units, polar monomer units, silane-functional monomer units, and mixtures thereof.

13. The curable adhesive composition of claim 1 wherein the adhesive composition further comprises at least one component selected from photoinitiator, thermal initiator, additives, plasticizers, and tackifiers.

14. The curable adhesive composition of claim 1 wherein the first oligomer has a $M_w$ of 5,000 g/mole to 50,000 g/mole.

15. The curable adhesive composition of claim 1, wherein the R3 is

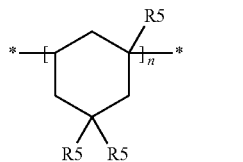

wherein R5 is independently hydrogen or methyl.

* * * * *

UNITED STATES PATENT AND TRADEMARK OFFICE
CERTIFICATE OF CORRECTION

| | | |
|---|---|---|
| PATENT NO. | : 9,890,304 B2 | |
| APPLICATION NO. | : 14/437214 | |
| DATED | : February 13, 2018 | |
| INVENTOR(S) | : Serkan Yurt | |

It is certified that error appears in the above-identified patent and that said Letters Patent is hereby corrected as shown below:

In the Specification

Column 4
Line 4, delete "for"U-PiCA" and insert -- for "U-PiCA --, therefor.

Column 5
Line 66, delete "polyethylenglycol-" and insert -- polyethyleneglycol- --, therefor.

Column 6
Line 10-11, delete "isoctylacrylate" and insert -- isooctylacrylate --, therefor.
Line 34, after "compound" insert -- . --.

Column 11
Line 6, delete "awl" and insert -- aryl --, therefor.
Line 26, delete "awl" and insert -- aryl --, therefor.
Line 40, delete "p=$M_w/M_n$" and insert -- $\rho=M_w/M_n$ --, therefor.

Column 12
Line 59, after "polymerizable" delete "olymerizable".

Column 17
Line 49, after "performance" insert -- . --.

Column 20
Line 37, delete "Chemitics" and insert -- Chemetics --, therefor.
Line 38, delete "Isothiolglycolate" and insert -- Isothioglycolate --, therefor.
Line 49-50, delete "DAROCUR ZLI-3331" and insert -- DAROCUR ZLI 3331 --, therefor.

Signed and Sealed this
Twenty-fourth Day of July, 2018

Andrei Iancu
*Director of the United States Patent and Trademark Office*

Column 22
Line 63, delete "(Meth)acryolyl" and insert -- (Meth)acryloyl --, therefor.

Column 24
Line 7, delete "ZLI-3331" and insert -- DAROCUR ZLI 3331 --, therefor.